(12) United States Patent
Conaway et al.

(10) Patent No.: US 11,941,071 B2
(45) Date of Patent: *Mar. 26, 2024

(54) METHODS AND SYSTEMS FOR GENERATING AND MANIPULATING ELECTRONIC VEHICLE CHECKLISTS USING WEB-BASED EDITING TOOL

(71) Applicant: Honeywell International Inc., Charlotte, NC (US)

(72) Inventors: Cody Ryan Conaway, Phoenix, AZ (US); Timothy R. DeWitt, Glendale, AZ (US); Kevin Wayne Williams, Phoenix, AZ (US)

(73) Assignee: Honeywell International Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/162,304

(22) Filed: Jan. 31, 2023

(65) Prior Publication Data

US 2023/0177091 A1  Jun. 8, 2023

Related U.S. Application Data

(63) Continuation of application No. 16/790,188, filed on Feb. 13, 2020, now Pat. No. 11,580,174.

(Continued)

(51) Int. Cl.
*G06F 16/90* (2019.01)
*G06F 16/23* (2019.01)
(Continued)

(52) U.S. Cl.
CPC ............ *G06F 16/951* (2019.01); *G06F 16/23* (2019.01); *G06F 16/953* (2019.01); *H04L 67/02* (2013.01)

(58) Field of Classification Search
CPC ...... G06F 16/23; G06F 16/951; G06F 16/953; G06Q 10/0633; H04L 67/02
See application file for complete search history.

(56) References Cited

U.S. PATENT DOCUMENTS 5,493,678 A    2/1996  Arcuri et al.
9,171,273 B2  10/2015  Thomas
(Continued)

FOREIGN PATENT DOCUMENTS

WO    2015085346 A1    6/2015

OTHER PUBLICATIONS

Article entitled "Put a Checklist in Your MFD", archived on Oct. 14, 2016, by OBDS, available at https://web.archive.org/web/20161014063103/https://obds.aero/services (Year: 2016).*

(Continued)

*Primary Examiner* — Mahesh H Dwivedi
(74) *Attorney, Agent, or Firm* — Fogg & Powers LLC

(57) ABSTRACT

Disclosed are methods, systems, and non-transitory computer-readable medium for a web-based process to generate electronic checklists and deploy electronic checklists. One method may include: receiving bulk data from a user device; parsing the bulk data to form a loadable database for an electronic procedure system of a vehicle; generating a rendering of an electronic checklist of one or more electronic checklists based on the loadable database; transmitting a first message to the user device, the first message including the rendering of the electronic checklist; iteratively performing an authoring process using a web-based tool to update the loadable database; receiving a second message from the user device, the second message including an instruction to transmit the updated loadable database to the electronic procedure system of the vehicle; and trans- (Continued)

mitting a third message to the vehicle, the third message including the updated loadable database.

17 Claims, 10 Drawing Sheets

Related U.S. Application Data

(60) Provisional application No. 62/805,132, filed on Feb. 13, 2019.

(51) Int. Cl.
  *G06F 16/951* (2019.01)
  *G06F 16/953* (2019.01)
  *H04L 67/02* (2022.01)

(56) References Cited

U.S. PATENT DOCUMENTS

| | | | |
|---|---|---|---|
| 11,580,174 B2* | 2/2023 | Conaway | G06F 16/953 |
| 2008/0208609 A1 | 8/2008 | Preece et al. | |
| 2012/0158238 A1 | 6/2012 | Daley et al. | |
| 2013/0138467 A1 | 5/2013 | Small et al. | |
| 2015/0081161 A1 | 3/2015 | Chapman et al. | |
| 2016/0314103 A1 | 10/2016 | Fox et al. | |
| 2016/0371624 A1 | 12/2016 | Breitschwerdt | |
| 2017/0199926 A1 | 7/2017 | Driscoll et al. | |
| 2017/0275018 A1* | 9/2017 | Narra | G06Q 10/06 |
| 2019/0130668 A1 | 5/2019 | Johnson et al. | |
| 2020/0242855 A1 | 7/2020 | Sandu et al. | |

OTHER PUBLICATIONS

Article entitled "Put a Checklist in Your MFD", by OBDS, archived on Oct. 14, 2016, available at https://web.archive.org/web/20161014063103/https://obds.aero/services (Year: 2016).

Extended European Search Report dated May 27, 2020, in counterpart European Patent Application No. 20157278.1 (9 pages, in English).

* cited by examiner

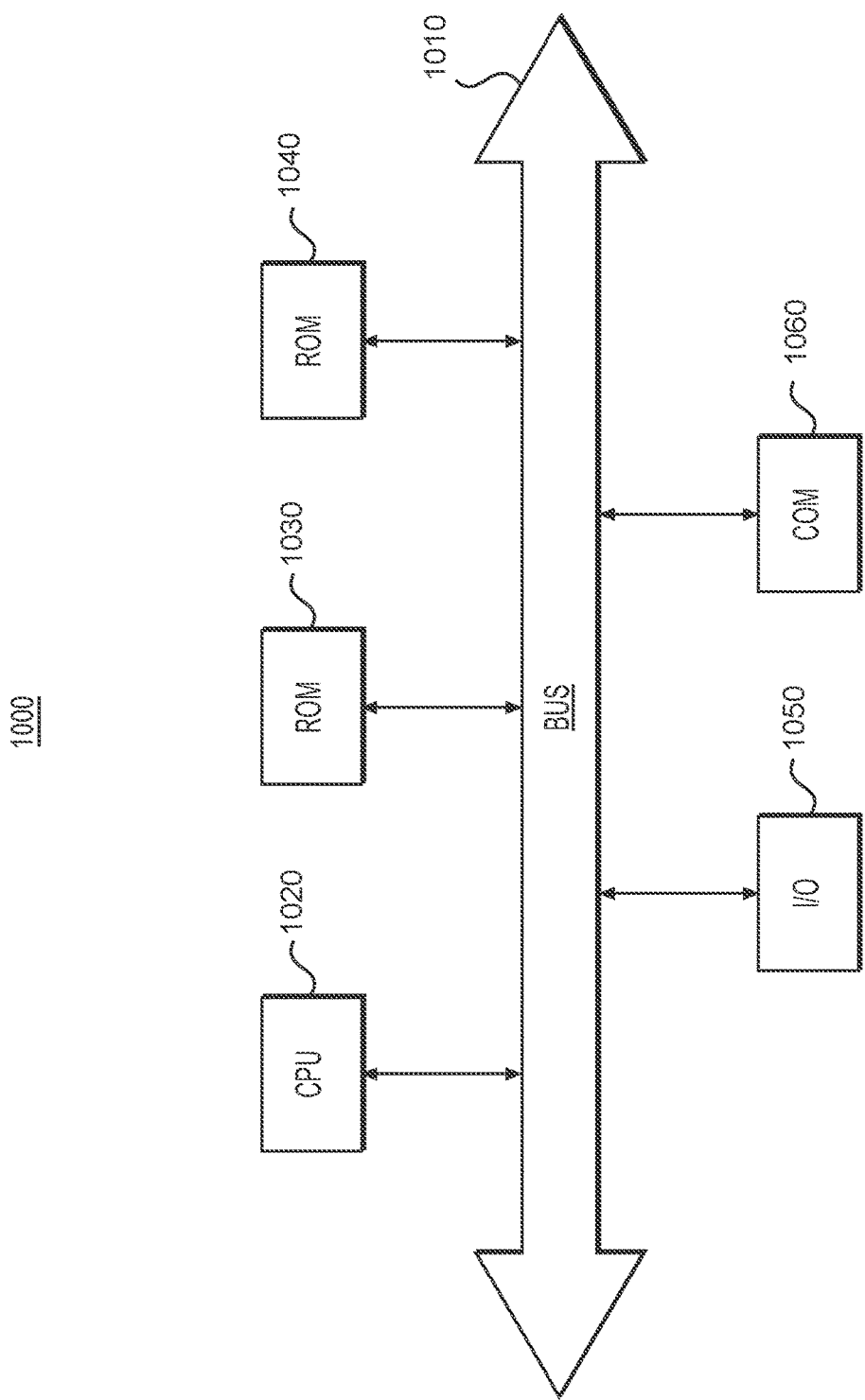

METHODS AND SYSTEMS FOR GENERATING AND MANIPULATING ELECTRONIC VEHICLE CHECKLISTS USING WEB-BASED EDITING TOOL

CROSS-REFERENCE TO RELATED APPLICATION(S)

This patent application is a continuation of and claims the benefit of priority to U.S. application Ser. No. 16/790,188, filed on Feb. 13, 2020, which claims the benefit of priority to U.S. Provisional Application No. 62/805,132, filed on Feb. 13, 2019, the entireties of which are incorporated herein by reference.

TECHNICAL FIELD

Various embodiments of the present disclosure relate generally to systems and methods for generating and using electronic vehicle checklists and, more particularly, to systems and methods for a web-based process and tool to generate and deploy electronic checklists to vehicles.

BACKGROUND

Electronic checklists are a critical component of modern aircraft operation and safety. Existing tools for creating aircraft checklists are typically deployed on desktop computers, and are limited in end-user usability and/or often use outdated design methodologies. For instance, existing aircraft checklist creator tools often require that an original equipment manufacturer (OEM) checklist author have XML programming skills to import a file into an aircraft checklist creator tool for generation and/or modification of a checklist. Authoring, modification, attribute selection, and selection of specific crew tasks of a checklist is complex and requires expert knowledge because it lacks an integrated system to review, modify, and deploy the checklist. Existing aircraft checklist creator tools also involve additional desktop application(s) to preview and prototype the checklist (e.g., to execute a simulation of the checklist) to understand the look and feel of the checklist. Furthermore, the checklist may be loaded to a bench testing system or airplane to be reviewed for correct implementation and usability. Moreover, the checklist is typically loaded onto an aircraft by, e.g., a wired connection to an aircraft system, and used by a crew of the aircraft. Therefore, existing aircraft checklist creator tools are often time intensive, and involve the use of multiple separate systems to generate, review, modify, evaluate, and deploy checklists.

The present disclosure is directed to overcoming one or more of these above-referenced challenges.

SUMMARY OF THE DISCLOSURE

According to certain aspects of the disclosure, systems and methods are disclosed for a web-based process to generate and deploy electronic checklists using a web-based editing tool.

For instance, a method may include receiving bulk data from a user device; parsing the bulk data to form a loadable database for an electronic procedure system of a vehicle; generating a rendering of an electronic checklist of one or more electronic checklists based on the loadable database; transmitting a first message to the user device, the first message including the rendering of the electronic checklist; iteratively performing an authoring process using a web-based tool to update the loadable database; receiving a second message from the user device, the second message including an instruction to transmit the updated loadable database to the electronic procedure system of the vehicle; and transmitting a third message to the vehicle, the third message including the updated loadable database.

A system may include a memory storing instructions; and a processor executing the instructions to perform a process. The process may include receiving bulk data from a user device; parsing the bulk data to form a loadable database for an electronic procedure system of a vehicle; generating a rendering of an electronic checklist of one or more electronic checklists based on the loadable database; transmitting a first message to the user device, the first message including the rendering of the electronic checklist; iteratively performing an authoring process using a web-based tool to update the loadable database; receiving a second message from the user device, the second message including an instruction to transmit the updated loadable database to the electronic procedure system of the vehicle; and transmitting a third message to the vehicle, the third message including the updated loadable database.

A non-transitory computer-readable medium may store instructions that, when executed by a processor, cause the processor to perform a method. The method may include: receiving bulk data from a user device; parsing the bulk data to form a loadable database for an electronic procedure system of a vehicle; generating a rendering of an electronic checklist of one or more electronic checklists based on the loadable database; transmitting a first message to the user device, the first message including the rendering of the electronic checklist; iteratively performing an authoring process using a web-based tool to update the loadable database; receiving a second message from the user device, the second message including an instruction to transmit the updated loadable database to the electronic procedure system of the vehicle; and transmitting a third message to the vehicle, the third message including the updated loadable database.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 10 depicts an example system that may execute techniques presented herein.

DETAILED DESCRIPTION OF EMBODIMENTS

Various embodiments of the present disclosure relate generally to systems and method for a web-based process to generate electronic checklists and deploy electronic checklists.

In general, the present disclosure is directed to a web-based process and editing tools to generate and deploy electronic vehicle checklists. Specifically, as discussed in detail below, a system of the present disclosure may provide an off-board (e.g., not on-board a vehicle), web-based process to generate checklists. Specifically, the web-based process may provide administration, customer, and operator view ports in a web-based application, where checklist authors may import, author, add/change features, preview, prototype, simulate, analyze, and generate checklists for an electronic procedure system of an aircraft. For instance, an author may review and/or modify warning structures, crew alerting system (CAS) messages, master minimum equipment lists (MMELs), minimum equipment lists (MELs), configuration deviation lists (CDLs), and/or task flows for checklists, and prepare checklist control files for the electronic procedure system of the aircraft.

Additionally, the web-based process of the present disclosure may reduce a number of programs and applications required by checklist authors to generate, review, or update the checklist control files for the electronic procedure systems. Moreover, the web-based process of the present disclosure may provide an end-to-end solution for the generation and deployment of checklist control files for electronic procedure systems, for use on a flight deck of aircraft. For instance, the web-based process may enforce compliance to a standard of procedural authoring, which may reduce crew error and workload. The web-based process may allow end users to generate checklists based on the standard, apply desired features to tasks (e.g., auto-sensing of task completion), preview the checklist in an exact flight deck look and feel of the end user aircraft, prototype/simulate the checklist without loading to a bench testing system or aircraft, and prepare a loadable checklist control file for the electronic procedure system of the aircraft.

While this disclosure describes the systems and methods with reference to aircraft, it should be appreciated that the present systems and methods are applicable to electronic checklists of vehicles, including those of drones, automobiles, ships, or any other autonomous and/or Internet-connected vehicle.

Figure 1:
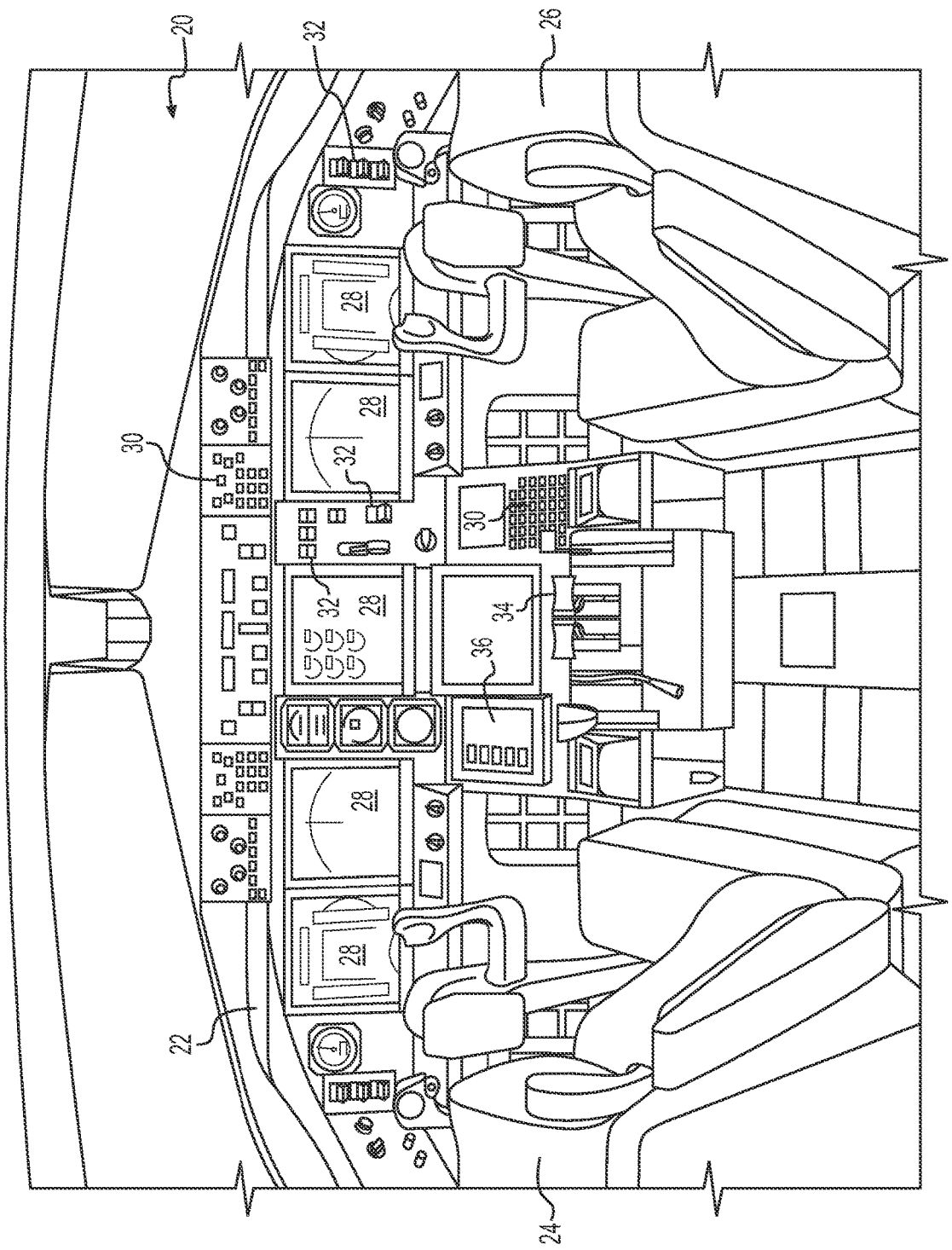
FIG. 1 depicts an exemplary vehicle system environment for displaying electronic vehicle checklists, according to one or more embodiments.

As shown in FIG. 1, an exemplary system environment for an electronic checklist is depicted, according to one or more embodiments. Specifically, FIG. 1 is a fragmentary perspective view illustrating the inside of an exemplary aircraft cockpit 20. Although the context of the following discussion is with respect to GUIs of touch screen displays used in aircraft, it should be understood that the teachings herein pertain to touch screen displays used in any type of vehicle including, but not limited to, land based vehicles such as automobiles and trains as well as watercraft and spacecraft. Additionally, the teachings herein are not limited to vehicle applications. Rather, the teachings herein may also be used together with touch screen displays that are employed in stationary applications such as information kiosks and automatic teller machines as well as with touch screen displays that are hand held or otherwise not mounted to a surface.

Aircraft cockpit 20 includes an instrument panel 22 positioned to be accessible from a pilot seat 24 and a copilot seat 26. Instrument panel 22 includes various front displays 28 and various control features such as buttons 30, switches 32, and throttle controls 34. Also mounted on instrument panel 22 is a control touch screen display 36. Moreover, the front displays 28 may also be touch screen displays.

Figure 2:
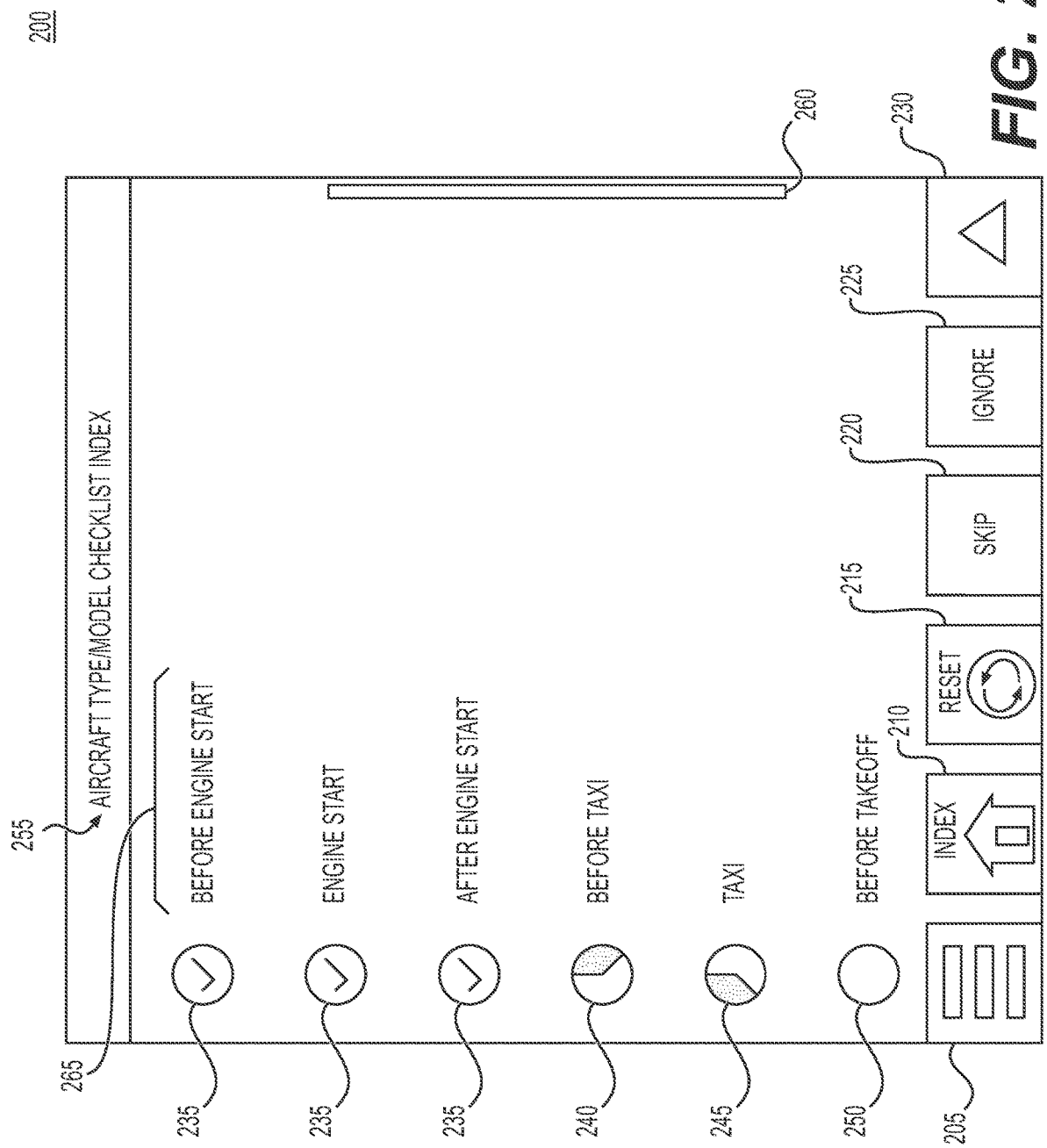
FIGS. 2 and 3 depict GUIs for exemplary electronic checklists, according to one or more embodiments.
Figure 3:
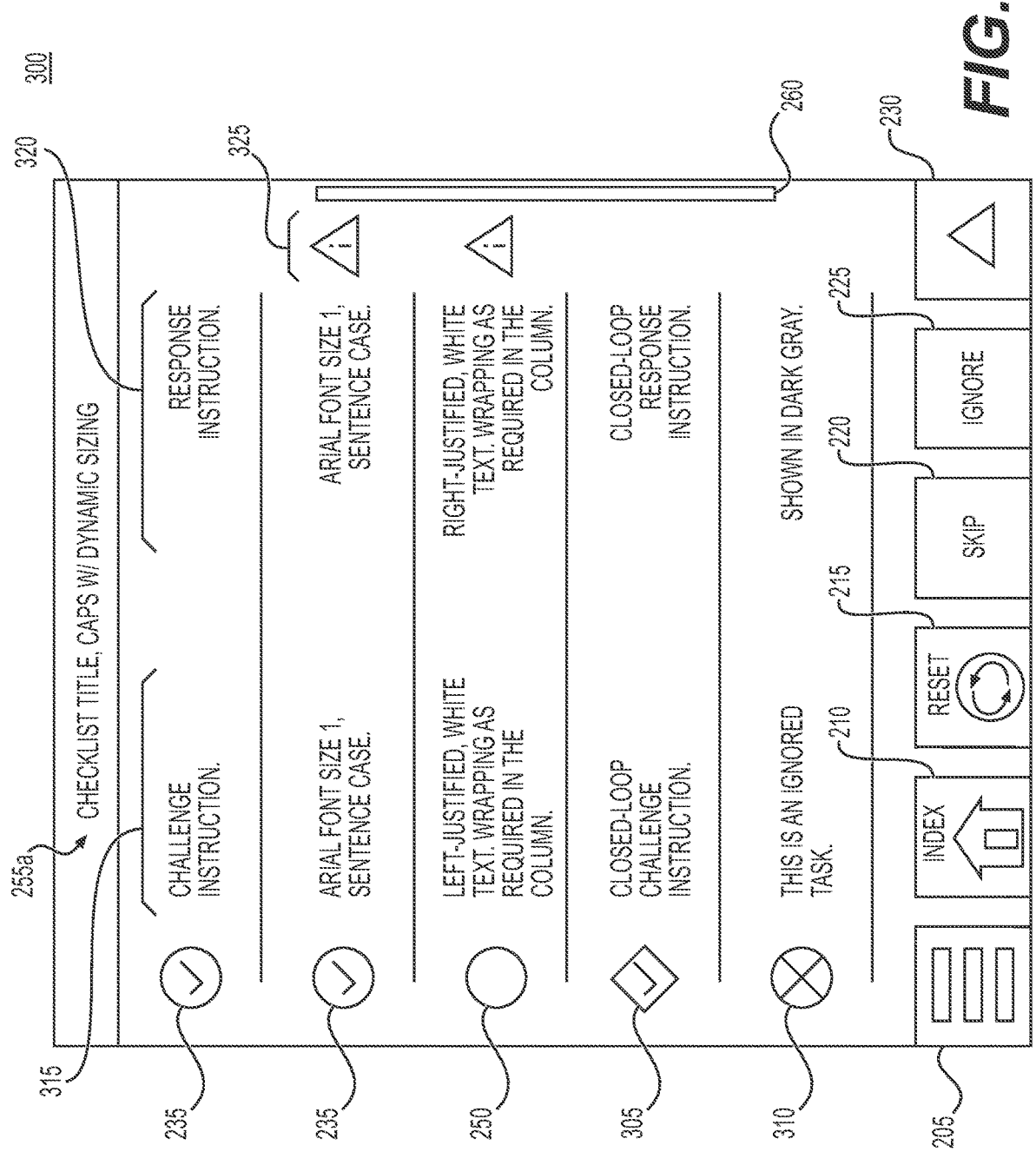

One of the front displays 28 or the control touch screen display 36 (called herein "vehicle manager touch screen") may be configured to operate as a vehicle manager that may display interactive electronic checklists and/or navigation or other vehicle system data. Specifically, a processor may execute a vehicle manager program (comprised of instructions executable by the processor) that causes the vehicle manager touch screen to display a vehicle manager display. For instance, the vehicle manager display may include one or more GUIs as disclosed herein (or variations thereof), such as GUI 200 and GUI 300 (as depicted in FIGS. 2 and 3, respectively).

The processor may cause the vehicle manager touch screen to display the vehicle manager display by generating images and transmitting the images to the vehicle manager touch screen to be displayed. Alternatively, the processor may generate instructions and information and transmit the instructions and information to a graphics processing unit (GPU). The GPU may generate the images to be displayed on the vehicle manager touch screen. The vehicle manager program may be stored in a memory. The memory may be connected to the processor so that the processor may receive stored instructions or data, and the processor may process the instructions, stored data, and received information, in accordance with the vehicle manager program. The memory and the processor may be connected to the vehicle manager touch screen either directly or indirectly. Collectively the memory, the processor, and the vehicle manager touch screen may be referred to as a "vehicle manager system." In one embodiment, the vehicle manager system may be an electronic procedure system of a vehicle.

For instance, the vehicle manager program may control a functionality and configuration of the vehicle manager touch screen, in accordance with a loadable checklist control file (called herein a "loadable database") received from a cloud service. The vehicle manager program may store the loadable database in the memory. The vehicle manager program may control the configuration of the vehicle manager touch screen, based on user inputs to the system, data from other vehicle systems, and/or FMS data from, e.g., a cloud FMS. Specifically, the vehicle manager program may display the vehicle manager display to depict an electronic checklist in accordance with the loadable database, and receive user inputs to view and/or change to the configuration of the vehicle manager touch screen.

Generally, user inputs may be a touch interaction with the vehicle manager touch screen (e.g., capacitive, resistive, and/or optical sensing), a user input on a keyboard, a mouse, a scroll wheel, or any other system-defined manner of selecting and interacting with the system. The processor may receive the user inputs and perform specific actions based on the user inputs, in accordance with the vehicle manager program.

FIGS. 2 and 3 depict exemplary GUIs for an electronic checklist, according to one or more embodiments. Specifically, FIGS. 2 and 3 may depict a functionality and configuration of the vehicle manager touch screen, in accordance with a loadable database received from a cloud service.

In FIG. 2, GUI 200 may include a group of home icons (including one or more of a system function menu icon 205, an index icon 210, a reset icon 215, a skip icon 220, an ignore icon 225, a display control drop down menu icon 230), one or more completed task indicators 235, one or more partially completed task indicators 240 and 245, one or more incomplete task indicators 250, a header 255, a scroll bar indicator 260, and one or more task titles 265. A processor, as described above, may cause GUI 200 to be displayed on the vehicle manager touch screen of the system. The GUI 200 may be a home menu for a vehicle manager system. One or more tasks (a task may be an indicator associated with a task title) may represent a sub-checklist. A user may select the task, and the sub-check list corresponding to the selected task may be displayed; for instance, FIG. 3 may depict an example of a sub-check list that is displayed in GUI 300. In each checklist (parent checklist), any task may represent a sub-checklist of the parent checklist (e.g., a sub-check list to a sub-checklist is a grandchild to the home menu).

In FIG. 3, the GUI 300 may include the same features as the GUI 200, however it may also be different, and it may include a different header 255a, one or more system completed task indicators 305, one or more ignored task indicators 310, one or more challenge instructions 315, one or more response instructions 320, and one or more additional information indicators 325. Specifically, as mentioned above, when a user selects a task with a sub-checklist, the processor may update the display to display the sub-checklist. The different header 255a may correspond to the task title 265 associated with the selected task (or a sub-checklist name if different than the task title 265). The one or more challenge instructions 315 and the one or more response instructions 320 may each be associated with an indicator. The one or more challenge instructions 315 may contain text associated with the task the user is to focus attention on. The one or more response instructions 320 may contains text associated with the task the crew is to the focus on. The one or more additional information indicators 325 may be checklist impact notifications (CINs). The one or more additional information indicators 325 may be associated with tasks that have additional information related to notes, cautions, and warnings. CINs may provide access to notes, cautions, and warnings for individual tasks by a message popup.

Figure 4:
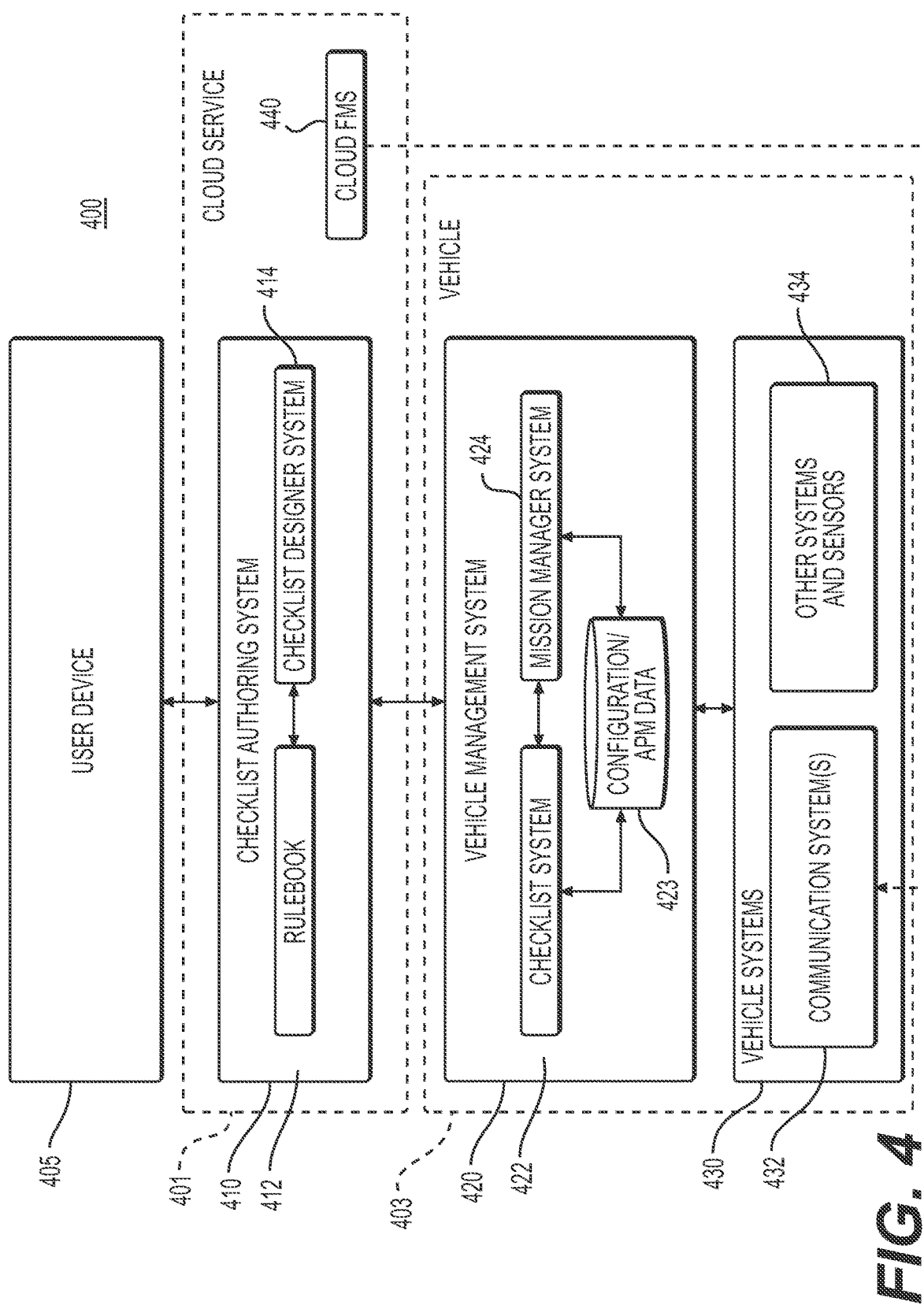
FIG. 4 depicts an exemplary block diagram of a system for a web-based process and system for generating and deploying electronic checklists, according to one or more embodiments.

FIG. 4 depicts an exemplary block diagram of a system 400 for a web-based process and system to generate and deploy electronic checklists, according to one or more embodiments. The system 400 may include a cloud service 401, a vehicle 403, and/or a user device 405.

The user device 405 and the cloud service 401 may communicate over a network using, e.g., a TCP/IP communication infrastructure. The cloud service 401 and the vehicle 403 may communicate over the network using, e.g., the TCP/IP communication infrastructure, or the cloud service 401 and the vehicle 403 may communicate over the network and/or satellite communications infrastructure, etc.

The user device 405 may be a computer system that includes at least a display/UI, a network interface, a processor, and a memory. The user device 405 may be a computer, a cell phone, a tablet, etc. The user device 405 may execute, by the processor, an operating system (O/S) and at least one application (each stored in the memory of the user device 405). The at least one application may be a browser program that enables a user of the user device 405 to interact with the cloud service 401. The display/UI of the user device 405 may be a touch screen or a display with other input systems (e.g., mouse, keyboard, etc.), and may display webpages and/or GUIs generated by the browser program, e.g., in response to messages from the cloud service 401. For instance, the display/UI of the user device 405 may display a web-tool visual editor 714, as discussed in FIGS. 7-8. The network interface of the user device 405 may be a TCP/IP network interface for, e.g., Ethernet or wireless communications over the network. The processor of the user device 405, while executing the browser program, may receive user inputs from the display/UI of the user device 405, and perform actions or functions in accordance with the browser program.

The cloud service 401 may include a checklist authoring system 410, a cloud flight management system (FMS) 440, and/or other software as a service (SaaS) systems. The checklist authoring system 410 may include a rulebook 412 and/or a checklist designer system 414.

The cloud FMS 440 may be a cloud-based platform that provides FMS services to any user who has authorized access to the cloud FMS 440. Specifically, the cloud FMS 440 may provide FMS microservices. The FMS microservices may be FMS services organized as a collection of specialized modular services. In some implementations, the FMS microservices may be software applications stored, at least in part, in one or more servers remote from the vehicle 403, for cloud-based access from the vehicle 403. The FMS microservices may be modular services which are developed, deployed, and scaled independently of each other, messaging-enabled to communicate with various components within the cloud FMS 440, and organized around capabilities. The FMS microservices may include, for example, flight planning services, in-flight navigation services, airport specific services, ground communication services, weather services, services for computing fuel scenarios, services for computing optimization scenarios, services for offsetting deviations, and services for computing approach procedures. The FMS microservices may be implemented as hardware, software, and/or a combination of hardware and software.

The rulebook 412 of the checklist authoring system 410 may inform and/or guide user generation of checklists in accordance with standards. Based on the standards, the rulebook 412 may include rulebook rules for the checklist designer system 414 to compile a loadable database. Specifically, the rulebook rules may define acceptable inputs, functions, and outputs based on syntax rules, and acceptable relationships between one or more input(s), one or more function(s), and one or more output(s) based on relationship rules.

The checklist designer system 414 of the checklist authoring system 410 may generate, modify, display, store, or deploy loadable database(s) for one or more vehicle(s) and one or more end user(s). Specifically, based on information from the rulebook 412 and messages from user devices, such as the user device 405, the checklist designer system 414 may provide a web-based process to generate, modify, display, store, or deploy loadable database(s), as discussed in more detail below with respect to FIGS. 5 and 7-8. Each loadable database may be used by an electronic procedure system of a vehicle to generate and control checklist GUIs. The loadable database may include one or more function(s) and one or more data structure(s) for generation and control of the checklist GUIs.

The vehicle 403 may include a vehicle management system 420 and vehicle systems 430. In one embodiment, the vehicle management system 420 may be an electronic procedure system of a vehicle. The vehicle management system 420 may include a checklist system 422, a mission manager system 424, and/or a configuration memory 423 storing configuration data and/or aircraft profile management (APM) data. The configuration data may include configuration rules that generally apply to checklists and/or display of information. The APM data may include additional configuration rules specific to different aircraft. The additional configuration rules may be defined by OEM authors 405A or the OEM. The vehicle systems 430 may include one or more communications system(s) 432 and other systems and sensors 434.

The one or more communications system(s) 432 may include one or more of a cellular communications system, a Wi-Fi system, a radio communications system, a satellite communications system, etc. The one or more communications system(s) 432 may receive and transmit messages to/from the vehicle 403 from/to the cloud 401 (e.g., the cloud FMS 440 or the checklist authoring system 410). The one or more communications system(s) 432 may also communicate with the vehicle management system 420. For instance, the one or more communications system(s) 432 may receive FMS data from the cloud FMS 440, and transmit the FMS data to the vehicle management system 420.

The other systems and sensors 434 may include one or more of navigation systems (e.g., GPS systems), engine systems, actuation systems, control systems, temperature systems, life systems, external sensors (e.g., weather radar, temperature, pressure, density, velocity sensors) or internal sensors (e.g., cabin pressure sensor), etc. of the vehicle 403. The other systems and sensors 434 may communicate with the vehicle management system 420. For instance, the other systems and sensors 434 may transmit vehicle systems data to the vehicle management system 420.

The checklist system 422 may communicate with the checklist designer system 414, the configuration memory 423, the mission manager system 424, and/or the other systems and sensors 434. The checklist system 422 may receive a loadable database from the checklist designer system 414. The checklist system 422 may also receive messages from the mission manager system 424; the configuration/APM data from the configuration memory 423; and the vehicle systems data of the other systems and sensors 434. The checklist system 422 may output checklists GUIs and/or information for checklist GUIs to the mission manager system 424, for displaying checklist GUIs by the mission manager system 424, in accordance with the loaded database, the messages, the configuration/APM data, and the vehicle systems data.

For instance, the checklist system 422 may extract one or more data structure(s) and one or more function(s) from the loadable database; extract rulebook rules from rulebook 412 (e.g., included in the loadable database or received directly from the checklist authoring system 410), extract data from databases of the vehicle 403; extract configuration rules from the configuration/APM data; extract sensor data and/or synoptic data from vehicle systems data; extract notifications from the messages from the mission manager system 424 (e.g., a selection based on user inputs or a CAS message); and extract phase of flight information from messages from the mission manager system 424 (collectively, "checklist inputs"). The checklist system 422 may validate the checklist inputs, e.g., to ensure correct source(s), correct format, etc.

As discussed above, the loadable database may include the one or more function(s) and the one or more data structure(s) for generation and control of the checklist GUIs. Specifically, a data structure may include content and arrangement information. The content may be displayed in a checklist GUI in accordance with arrangement information. The configuration rules of the configuration/APM data may include display rules for how the content is to be displayed in accordance with the arrangement information. A function may include program code for how system and/or user inputs are to update the checklist GUI (e.g., as outputs).

For instance, the one or more data structure(s) may include information about MELs, MMELs, aircraft flight manuals (AFMs), CDLs. The program code of the one or more function(s) may control checklist GUIs and data based on events. Events may be based phase of flight, CAS messages, flight plan data, flight data, synoptics, and/or pilot action(s). For example, a function may start based on a phase of flight event (e.g., transition between takeoff and cruise), and the function may generate and display a first checklist GUI corresponding to one or more tasks for the transition from takeoff to cruise. As another example, a function may start based on an emergency event (e.g., information indicating a sensor detecting smoke, which may be included in the vehicle systems data), and generate and display a second checklist GUI corresponding to one or more tasks for resolving the emergency event. As discussed above, the checklist GUIs may be based on the one or more data structure(s), the configuration/APM data, and/or the one or more function(s).

The mission manager system 424 may communicate with the checklist system 422, the configuration memory 423, the other systems and sensors 434, and the cloud FMS 440 (via, e.g., the one or more communications systems 432). The mission manager system 424 may receive messages from the checklist system 422 (e.g., information/instructions/graphics for displaying the checklist GUI); the configuration/APM data from the configuration memory 423; the vehicle systems data of the other systems and sensors 434; and/or the FMS data from the cloud FMS 440.

The mission manager system 424 may manage MEL data, manage flight plan buffer and/or display, and/or manage checklist display and interactions from a user, such as a crew of an aircraft. Specifically, the mission manager system 424 may display one or more of the checklist GUIs, and receive and process user inputs. For instance, the mission manager system 424 may render GUIs for managing phase of flight based checklists, GUIs for managing CAS/emergency checklists, and/or GUIs for aircraft configurations, and manage crew selections with respect to the rendered GUIs. For instance, the mission manager may render the GUIs, as based on the messages from the checklist system 422; the configuration/APM data from the configuration memory 423; the vehicle systems data of the other systems and sensors 434; and/or the FMS data from the cloud FMS 440.

Figure 5:
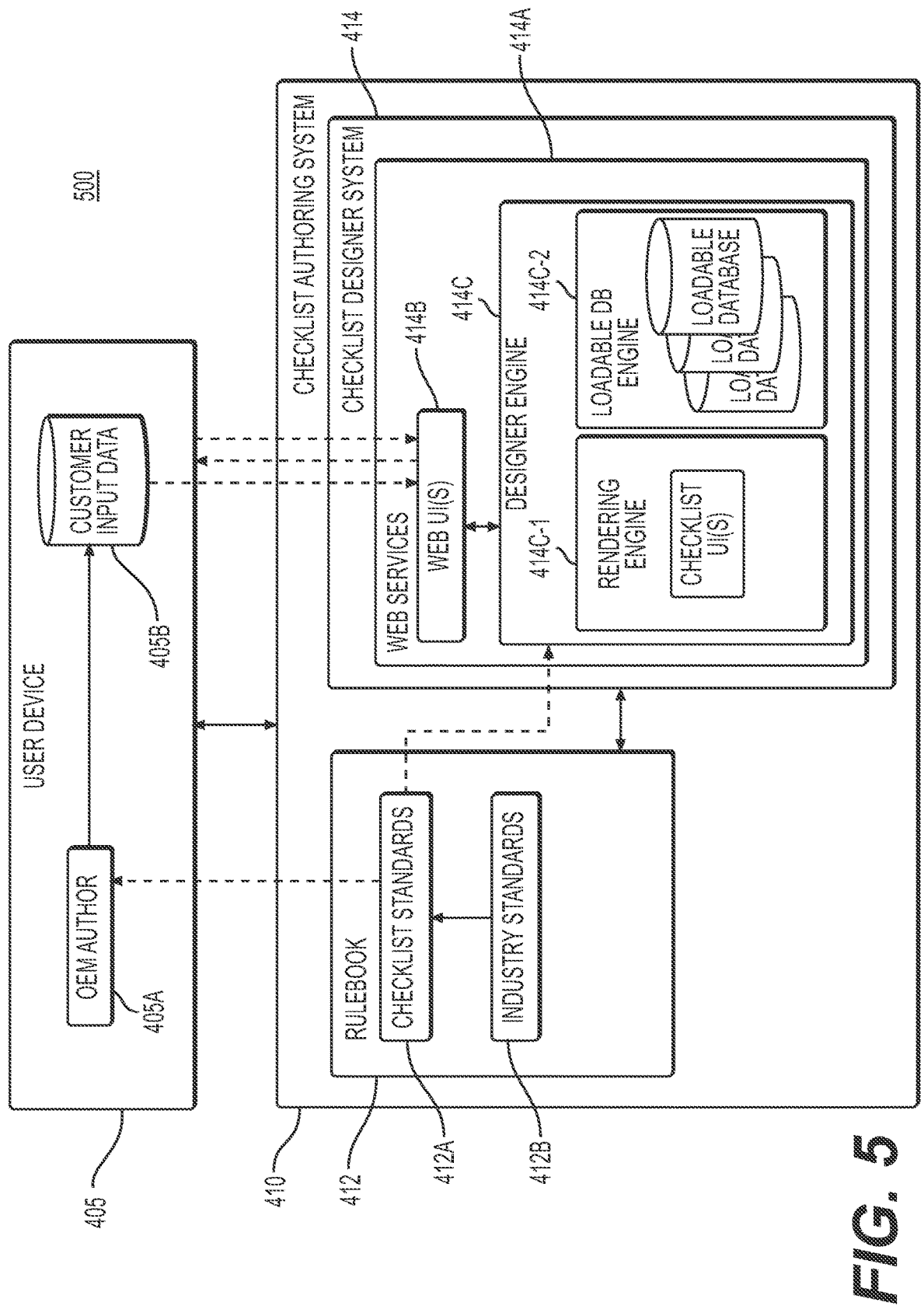
FIG. 5 depicts an exemplary block diagram of a system for a web-based process to generate and deploy electronic checklists, according to one or more embodiments.

FIG. 5 depicts an exemplary block diagram of a system for a web-based process to generate electronic checklists and deploy electronic checklists, according to one or more embodiments. The system 500 may include the user device 405 and the checklist authoring system 410 of FIG. 4.

Specifically, the rulebook 412 may include checklist standards 412A and industry standards 412B; the checklist designer system 414 may include web services 414A. The web services 414A may include web UI(s) 414B and a designer engine 414C.

The industry standards 412B may include requirements for vehicle operations and/or software handling of information. For instance, the industry standards may include requirements based on FAA rules, S1000D, and ATA 2300. S1000D may be an XML specification for preparing, managing, and using equipment maintenance and operations information. ATA 2300 may be a data exchange standard for flight operations.

The checklist standards 412A may include the requirements of the industry standards 412B and include additional requirements for the one or more data structure(s) and the one or more function(s) of loadable database(s). For instance, the additional requirements may be for content and arrangement information of checklists, content and structure of AFMs, content and structure of MELs, content and structure of MMELs, etc. Moreover, checklist standards 412A may define a file structure of a loadable database for parsing the loadable database for: titles, paragraphs, text of content of data structures; arrangement information of data structures; and inputs, program code, and outputs of functions.

The checklist standards 412A may include the rulebook rules for the checklist designer system 414 to compile a loadable database, and the rulebook rules may be based on the requirements included in the checklist standards 412A. As discussed above, the rulebook rules may define acceptable inputs, functions, and outputs based on syntax rules, and acceptable relationships between one or more input(s), one or more function(s), and one or more output(s) based on relationship rules.

The web services 414A may receive and transmit messages from/to user devices, such as the user device 405. For instance, the web services 414A may authenticate a user of the user device 405 as an OEM author 405A (e.g., by a username-password combination). An OEM author 405A may be allowed to generate, modify, display, store, or deploy loadable database(s) for one or more vehicle(s).

The web services 414A may receive messages from the user device 405 for bulk loading of customer input data 405B (e.g., bulk information for checklist information, MEL information/MMEL information, CDL information, AFM information), e.g., by using an API endpoint as one web UI. The web services 414A may include a parser to parse the customer input data 405B. The parser may be based on the rulebook rules. The parser may extract, from the customer input data 405B: titles, paragraphs, text of for content of data structures; arrangement information for data structures; and inputs, program code, and outputs for functions.

Additionally, the web services 414A may generate and transmit the web UI(s) 414B, in accordance with information from the designer engine 414C, such as discussed below with respect to FIGS. 7-8. For instance, the web UI(s) may enable a user of the use device 405 to generate, modify, display, store, or deploy a loadable database in a browser on the user device 405.

The designer engine 414C may include a rendering engine 414C-1 and a loadable DB engine 414C-2. The designer engine 414C may receive messages from the user device 405 (such as user inputs into a web UI or the customer input data 405B) and, in accordance with the rulebook rules, generate, modify, display, store, or deploy a currently active loadable database. A currently active loadable database may be a loadable database selected by the user of the user device 405 to generate, modify, display, store, or deploy.

The loadable DB engine 414C-2 may compile the currently active loadable database, based on information associated with the currently active loadable database (e.g., information already received) and information received in messages from the user device 405. The loadable DB engine 414C-2 may store the compiled currently active loadable database in data storage. The loadable DB engine 414C-2 may provide information to the web services 414A to generate one or more aspects of the web UI(s) 424B.

The rendering engine 414C-1 may generate rendering(s) of a current checklist, in accordance with currently active loadable database and parameters of a target display hardware. A current checklist may be a checklist selected by the user of the user device 405 to generate, modify, display, or store the checklist. The rendering engine 414C-1 may provide the rendering(s) to the web services 414A to generate one or more aspects of the web UI(s) 414B.

Additionally or alternatively, the designer engine 414C may receive the customer input data 405B, parse the customer input data 405B, e.g., by using the parser, and/or validate the customer input data 405B. To validate the customer input data 405B, the designer engine 414C may determine whether the customer input data 405B complies with the syntax rules.

The designer engine 414C may receive, via messages from the user device 405, author inputs to add, delete, or edit a checklist; add, delete, or edit flowcharts for a checklist; add, delete, or edit one or more element(s) in one or more location(s) on a rendering of the checklist; and/or add, delete, or edit tags for an element. Elements may be symbols, objects, or text. Symbols may be displayed on a checklist, but may not be interactive. Objects may be displayed on a checklist and may be interactive (e.g., a toggle button, a menu button, a link, etc.). Text may be alphanumeric strings of characters. Text may be applied to symbols or objects, and/or displayed separately from symbols or objects. Tags may apply procedure attributes to an element, link synoptics with an element, link sensors with an element, link CAS messages with an element, link phase of flight with an element, link another checklist, and/or invoke program code based on an input to an element. The designer engine 414C may generate the one or more function(s) of a loadable database using the tags and flowcharts. The designer engine 414C may validate the author inputs to determine whether the author edits comply with the syntax rules.

If the designer engine 414C determines that the customer input data 405B and/or the author inputs comply with the syntax rules, the designer engine 414C may accept the customer input data 405B and/or the author inputs, and compile the loadable database. If the designer engine 414C determines that the customer input data 405B and/or the author inputs do not comply with the syntax rules, the designer engine 414C may display an error message regarding the customer input data 405B and/or the author inputs, and/or display a debugging message to resolve the error message.

The designer engine 414C may also perform an integrity check on the currently active loadable database and/or aspects thereof, to ensure one or more checklist(s), flowchart(s), element(s), and/or tag(s) receive and return valid values in sequence. A valid value may be determined by applying the relationship rules to each possible sequence of a checklist, flowchart, or tag to ensure each input is acceptable, and each output to a next checklist task, flowchart element, or tag, if any, is acceptable.

If the designer engine 414C determines that the currently active loadable database and/or aspects thereof comply with the relationship rules, the designer engine 414C may accept the currently active loadable database and/or aspects thereof, and compile the loadable database. If the designer engine 414C determines that the currently active loadable database and/or aspects thereof do not comply with the relationship rules, the designer engine 414C may display an error message regarding the currently active loadable database and/or aspects thereof, and/or display a debugging message to resolve the error message.

Therefore, the web services 414A of the checklist designer system 414 may provide a web-based process to generate, modify, display, store, or deploy loadable database(s). Specifically, the web services 414A of the checklist designer system 414 may reduce development and testing time, and reduce a number of separate systems to review, modify, evaluate, and deploy checklists. Furthermore, because the web services 414A of the checklist designer system 414 may enforce syntax and relationship rules, the web services 414A of the checklist designer system 414 may ensure compliance with standards, which may reduce training time for crew and/or errors in crew operation because resulting checklists may adhere to the standards in a consistent manner.

Figure 6:
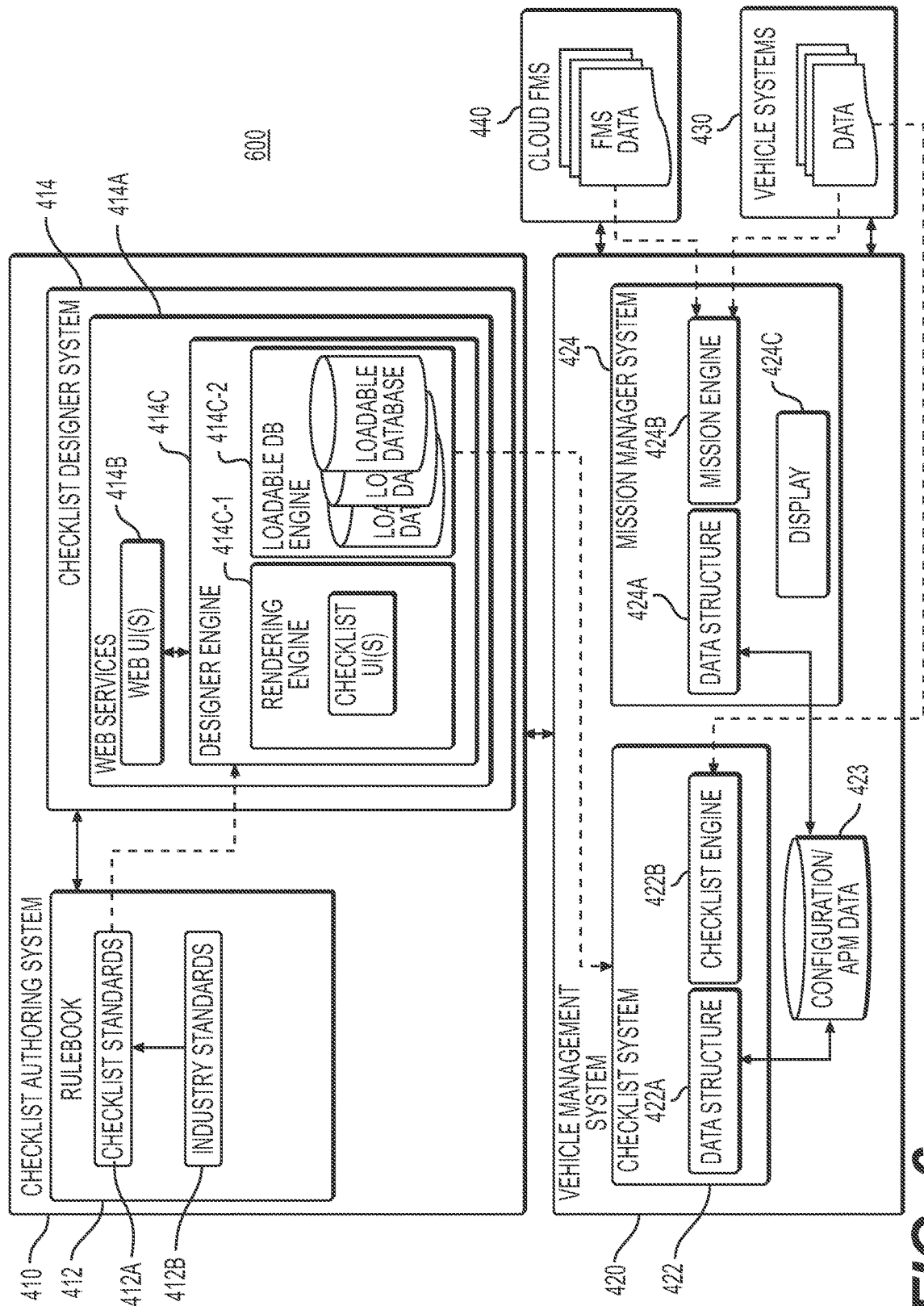
FIG. 6 depicts an exemplary block diagram of a system for a web-based process to generate and deploy electronic checklists, according to one or more embodiments.

FIG. 6 depicts an exemplary block diagram of a system for a web-based process to generate electronic checklists and deploy electronic checklists, according to one or more embodiments. The system 600 may include the checklist authoring system 410, the vehicle management system 420, the vehicle systems 430, and the cloud FMS 440 of FIG. 4. Specifically, the checklist system 422 of the vehicle management system 420 may include a data structure 422A and a checklist engine 422B; the mission manager system 424 of the vehicle management system 420 may include a data structure 424A, a mission engine 424B, and a display 424C.

In response to a user input to the web services 414A, the web services 414A may transmit to the checklist system 422 a loadable database. The checklist system 422 may extract one more data structure(s) and one or more function(s) from the loadable database. The checklist system 422 may load the one or more data structure(s) into the data structure 422A of the checklist system 422. The checklist system 422 may also load configuration rules from the configuration/APM data into the data structure 422A.

The checklist system 422 may load the one or more function(s) into the checklist engine 422B of the checklist system 422. The checklist engine 422B may receive messages from the mission manager system 424 and vehicle systems data from the other systems and sensors 434. In accordance with the one or more function(s), the messages, and/or the vehicle systems data, the checklist engine 422B may generate messages to instruct the mission manager system 424 to display checklist GUIs.

Specifically, the checklist engine 422B may determine whether an event has occurred. In response to determining that an event has occurred (e.g., based on a message and/or the vehicle system data), the checklist engine 422B may invoke a function of the one or more function(s) that corresponds to the event. The checklist engine 422B may process a program code of the function on inputs of the function, and return a result. The checklist engine 422B may transmit the result to the mission manager system 424. The result may be an update or change in a checklist GUI. The result may include information about content and arrangement information of the content from the data structure 422A, etc.

The data structure 424A of the mission manager system 424 may store state variables of the mission and/or information about vehicle systems or messages (e.g., CAS messages, current phase of flight, FMS data from the cloud FMS 440, etc.) for the mission engine 424B. The mission engine 424B may access the state variables and information about vehicle systems or messages, and the mission engine 424B may receive messages from the checklist system 422 (e.g., information/instructions/graphics for displaying the checklist GUI); the configuration/APM data from the configuration memory 423; the vehicle systems data of the other systems and sensors 434; and/or the FMS data from the cloud FMS 440 (collectively "mission information").

Based on the mission information, the mission engine 424B may generate and display GUIs on the display 424C, which may be the vehicle manager touch screen discussed above with respect to FIG. 1. The mission engine 424B may receive and process user inputs and system information to update the GUIs, transmit messages to the checklist engine 422B, receive response messages from the checklist engine 422B, and update the GUIs accordingly.

Figure 7:
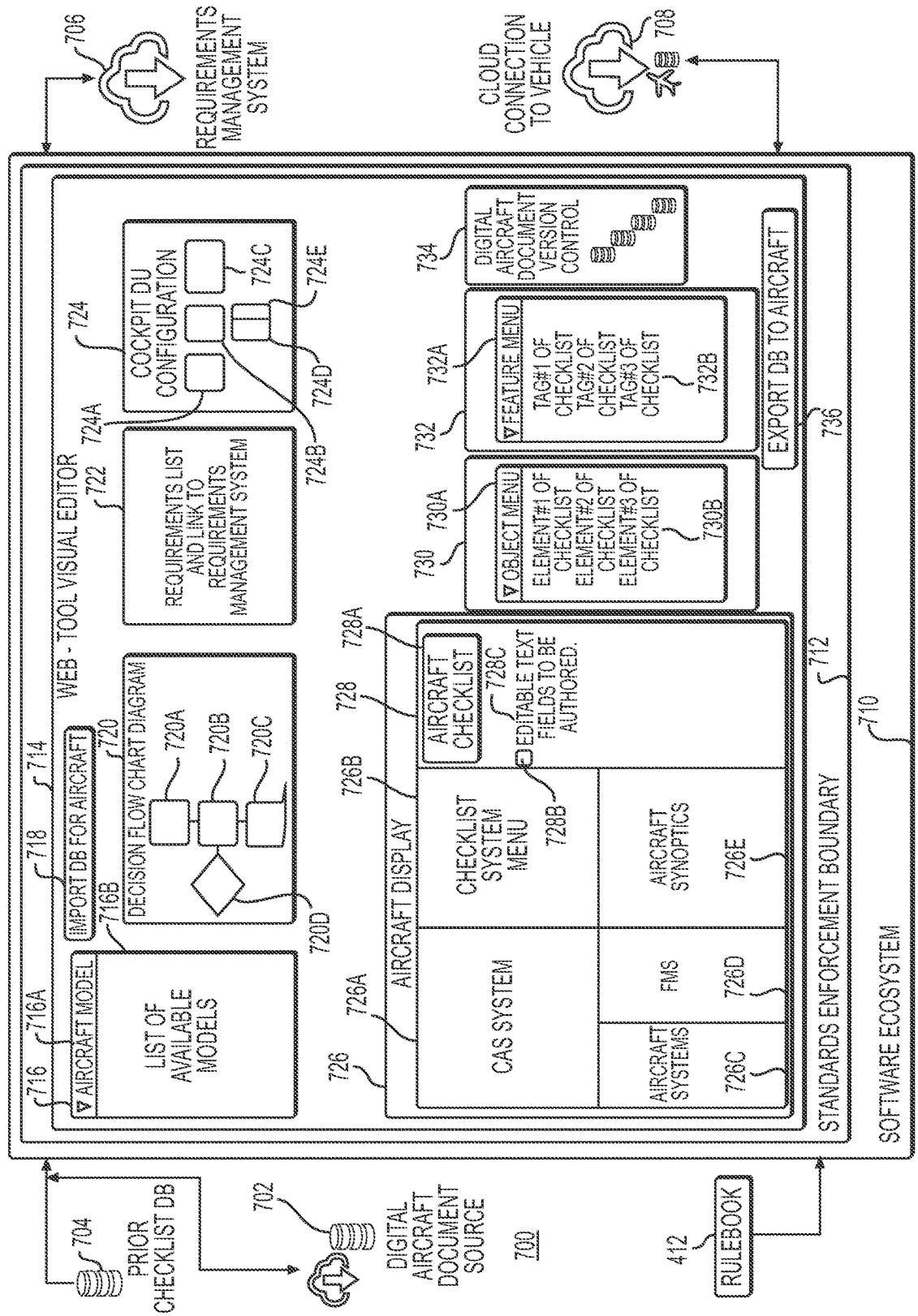
FIG. 7 depicts an exemplary system for a web-based process to generate and deploy electronic checklists, according to one or more embodiments.

FIG. 7 depicts an exemplary system for a web-based process to generate electronic checklists and deploy electronic checklists, according to one or more embodiments. The system 700 may include a digital aircraft document source 702, a prior checklist DB 704, a requirements management system 706, a cloud connection to vehicle(s) 708, and a software ecosystem 710 of, e.g., a checklist authoring system, such as the checklist authoring system 410.

The software ecosystem 710 may include a standards enforcement boundary 712 and a web-tool visual editor 714. The software ecosystem 710 may correspond to the web services 414A discussed above. Within the standards enforcement boundary 712, the software ecosystem 710 may ensure that generation, modification, and deployment of checklists follow syntax and relationship rules.

The web-tool visual editor 714 may be a GUI generated and displayed (e.g., in a browser) based on transmission and reception of messages between a user device, such as the user device 405, and the web services 414A. Specifically, a user of the user device 405 may make user inputs; the user device 405 may transmit the user inputs and/or corresponding data (or cause the corresponding data to be transmitted) to the web services 414A; the web services 414A may receive the user inputs and/or corresponding data; the web services 414A may process the user inputs and/or corresponding data to obtain results, such as edit a loadable database and/or generate renders of checklist GUIs; the web services 414A may transmit an update message with information (e.g., edit accepted, transmission complete, etc., as discussed below) and/or renderings of checklist GUIs; and the user device 405 may display an updated GUI for the web-tool visual editor 714 based on the update message. The user, by using the user device 405 and the web-tool visual editor 714, may iteratively perform an authoring process by making edits to a loadable database.

The web-tool visual editor 714 may include a model selection section 716, an import icon 718, decision flowchart diagram section 720, a requirements list section 722, a cockpit DU configuration section 724, an aircraft display section 726, an object menu 730, a feature menu 732, a document version control section 734, and/or an export icon 736.

The model selection section 716 may include model selection icon 716A and/or a list of available models 716B. The model selection icon 716A may be selectable by a user input to cause a menu to display (either over-laid onto the web-tool visual editor 714 or in a separate browser window) different types of aircraft models (e.g., different versions of aircraft), such as the list of available models 716B. The list of available models 716B may be a list of different aircraft for which loadable databases are to be generated, have been generated and are stored on the web-tool visual editor 714, or have been generated and deployed by the web-tool visual editor 714.

The digital aircraft document source 702 may include checklist information, MEL information/MMEL information, CDL information, and/or AFM information. For instance, the digital aircraft document source 702 may be generated by an OEM author 405A on the user device 405 for one or more vehicles. The prior checklist DB 704 may include information about prior checklist databases for one or more vehicles. The import icon 718 may be selectable by a user to launch an import or sync process to obtain/sync the digital aircraft document source 702 and/or the digital aircraft document source 702.

Each available model of the list of available models 716B may be selectable by a user input to launch an authoring process for a loadable database corresponding to the available model (hereinafter called "active loadable database"). For instance, a user may select (by a user input) a first available model of the list of available models 716B; the user device 405 may transmit a message to the web services 414A indicating the first available model was selected; the web services 414A may (e.g., by using the designer engine 412C) generate and transmit a message including information and/or GUIs for a loadable database corresponding to the first available model. Subsequently, the user may make edits or deploy the loadable database by inputting one or more user inputs to the device 405, or the user may change to a different loadable database by selecting a different available model of the list of available models 716B.

The requirements list section 722 may include a sync button and a list of one or more MELs for one or more checklists. The sync button may be selectable by a user to launch an upload or sync process from the user device 405 to upload one or more MELs for one or more checklists (e.g., upload a file or bulk loading of customer input data 405B, as discussed above). For instance, the file or bulk loading of customer input data 405B may include information about one or more MELs for one or more checklists.

The list of one or more MELs for one or more checklists may correspond to the uploaded one or more MELs for one or more checklists. Each MEL of the list of one or more MELs may be selectable by a user input to display a flowchart diagram in the decision flowchart diagram section 720 for a corresponding checklist and/or a rendering of the checklist in the aircraft display section 726 for the active loadable database (hereinafter an "active MEL"). For instance, a user may select (by a user input) a first MEL of the list of one or more MELs; the user device 405 may transmit a message to the web services 414A indicating the first MEL was selected; the web services 414A may (e.g., by using the designer engine 412C) generate and transmit a message including information and/or GUIs for a loadable database corresponding to the first MEL (e.g., a first flowchart diagram in the decision flowchart diagram section 720 for a corresponding checklist and/or a first rendering of the checklist in the aircraft display section 726). Subsequently, the user may make edits to first flowchart diagram in the decision flowchart diagram section 720 for the corresponding checklist and/or the first rendering of the checklist in the aircraft display section 72 by inputting one or more user inputs to the device 405, or the user may change to a different MEL by selecting a different MEL of the list of one or more MELs.

The decision flowchart diagram section 720 may include one or more flowchart elements of an active flowchart, such as flowchart elements 720A-720D. The active flowchart may correspond to the active MEL. The flowchart elements 720A-720D may be initialized to correspond to the equipment included the active MEL. The user may add or delete flowchart elements. Each of the one or more flowchart elements 720A-720D may be selectable use a user input to launch a flowchart edit process for the selected flowchart element. The user may edit the selected flowchart element by one or more processes of: click-dragging the selected flowchart element to a different location in the flowchart to rearrange the order of the flowchart; or changing a function associated with the flowchart element, e.g., by changing tags associated with the flowchart element. The flowchart may link one or more checklist(s) by defining one or more flowchart element(s) as links to the one or more checklist(s).

The cockpit DU configuration section 724 may include one or more DUs 724A-724D and/or an active region 724E. The one or more DUs 724A-724D may correspond to a physical arrangement and/or configuration (e.g., type of display unit) of display units in a vehicle for the active loadable database. The active region 724E may indicate a region of the one or more DUs 724A-724D that is currently being edited by the user of the user device 405. The DU with the active region 724E may correspond to the aircraft display section 726 that is currently being edited by the user of the user device 405. Alternatively, the active region 724E may be selectable by a user input to change the region currently being edited by the user of the user device 405 to a different region of the one or more DUs 724A-724D, e.g., by click-dragging the active region 724E to the different region of the one or more DUs 724A-724D.

The aircraft display section 726 may include one or more vehicle system displays, such as a CAS system display 726A, a checklist system menu display 726B, an aircraft systems display 726C, a FMS systems display 726D, and/or an aircraft synoptic display 726E, and/or a checklist display 728. The one or more vehicle system displays 726A-726E may be added or deleted from the aircraft display section 726 based on user inputs. The relative sizes of the checklist display 728 and/or the one or more vehicle system displays 726A-E may be adjusted by user inputs, such as click-dragging borders between the checklist display 728 and/or the one or more vehicle system displays 726A-E, or text entry of absolute or relative sizes into a corresponding menu.

The checklist display 728 may include checklist title 728A, one or more interactive or non-interactive element(s) 728B, and/or one or more text element(s) 728C (collectively "display elements"). The checklist display 728 may be initialized to correspond to the equipment included the active MEL and/or to the active flowchart. Specifically, the checklist title 728A, the one or more interactive or non-interactive element(s) 728B, and/or the one or more text element(s) 728C may be initialized to correspond to the flowchart elements of the active flowchart and/or the equipment of the active MEL. The user may add or delete display element by a drag and drop process. Each of the current display elements may be selectable use a user input to launch a display element edit process for the selected display element. The user may edit the selected display element by one or more processes of: click-dragging the selected display element to a different location in the checklist display 728 to rearrange the display elements; editing associated text of a display element; or adding, deleting or, editing a function associated with the flowchart element, e.g., by changing tags associated with the display element.

The interactive element(s) 728B may be objects displayed on a checklist and may be interactive (e.g., a toggle button, a menu button, a link, etc.) with user inputs based on tags associated with the interactive element(s) 728B. The user inputs of interactive elements may be used as inputs to corresponding functions of flowchart elements. The non-interactive element(s) 728B may be symbols displayed on a checklist, but may not be interactive with user inputs. The text element(s) 728C may be alphanumeric strings of characters in text-boxes (with borders opaque or transparent). The text element(s) 728C may be applied to the one or more interactive or non-interactive element(s) 728B, and/or displayed separately from the one or more interactive or non-interactive element(s) 728B. The text-boxes of the text element(s) 728C may be adjusted by user inputs, and/or the text-boxes of certain text elements 728C may be defined to certain locations on a display region of a checklist display 728 (e.g., on a left or right side of a checklist, at a top or bottom of a checklist, etc.). The text of the text element(s) 728C may be displayed in accordance with text display rules (e.g., a challenge will be displayed in a first font, size, etc. and a response will be displayed in a second font, size, etc.).

The user may apply tags to the interactive element(s) 728B by a user input on the interactive element(s) 728B and then a user input on a tag from the feature menu 732; or by selecting a tag from the feature menu 732 and then a user input on the interactive element(s) 728B. As discussed above, tags may apply procedure attributes to an element, link synoptics with an element, link sensors with an element, link CAS messages with an element, link phase of flight with an element, link another checklist, and/or invoke program code based on an input to an element.

The object menu 730 may include an object menu icon 730A and/or a list of elements 730B. The object menu icon 730A may be selectable by a user input to cause a menu to display (either over-laid onto the web-tool visual editor 714 or in a separate browser window) different types of display elements, such as the list of elements 730B. The list of elements 730B may be a list of different display elements, as discussed above, such as a first list of interactive element(s) 728B, a second list of non-interactive element(s) 728B, and/or a third list of text element(s) 728C, a list of emergency elements, etc.

Each display element of the list of elements 730B may be selectable by a user input to launch a first authoring process for the checklist display 728. For instance, a user may select (by a first user input) a first display element of the list of elements 730B and input a second user input at a location on the checklist display 728; the user device 405 may transmit a message to the web services 414A indicating the first display element was selected and the location on the checklist display 728; the web services 414A may (e.g., by using the designer engine 412C) generate and transmit a message including information (e.g., that the addition of the first display element was accepted) and/or GUIs for an updated loadable database.

In one aspect of the disclosure, the first user input and the second user input may a drag and drop process wherein the first user input selects the first display element, and the user may continue to click/touch until the second user input at the location of the second user input (e.g., an end of the drag). Alternatively, the user may not need to continue to click/touch, instead the first user input may select the first display element, and the second user input may determine the location (for instance if the second user input is within the checklist display 728).

The feature menu 732 may include a feature menu icon 732A and/or a list of tags 732B. The feature menu icon 732A may be selectable by a user input to cause a menu to display (either over-laid onto the web-tool visual editor 714 or in a separate browser window) different types of tags, such as the list of tags 732B. The list of tags 732B may be a list of different tags, as discussed above, such as a first list of tags for linking, a second list of tags for program code, a third list of tags for applying procedure attributes, etc.

Each tag of the list of tags 732B may be selectable by a user input to launch a second authoring process for the checklist display 728. For instance, a user may select (by a user input) a first tag of the list of tags 732B and input a second user input on a display element; the user device 405 may transmit a message to the web services 414A indicating the first tag was selected and the second user input on the display element; the web services 414A may (e.g., by using the designer engine 412C) generate and transmit a message including information (e.g., that the addition of the first tag was accepted) and/or GUIs for an updated loadable database.

In response to user inputs into anyone one of the decision flowchart diagram section 720 on the flowchart elements 720A-720D, the requirements list section 722, or the aircraft display section 726 on the display elements (collectively "state change for active checklist"), the web-tool visual editor 714 may automatically translate the state change from the user input to the other relevant sections. For instance, in response to a user input to delete a flowchart element, e.g., flowchart element 720D, the web-tool visual editor 714 may automatically translate a corresponding change to associated display elements of the aircraft display section 726 (e.g., delete a display element) and translate a corresponding change to the active MEL (e.g., to delete a corresponding equipment of the MEL).

In response to user inputs, periodically at predetermined intervals, or in response to a debug request from a user input, the web-tool visual editor 714 may perform a validation process on the active loadable database. The web-tool visual editor 714 may validate the active loadable database to determine whether the active loadable database complies with the syntax rules and/or the relationships rules. Alternatively, each user input may be validated to determine whether the active loadable database, as adjusted by the user input, complies with the syntax rules and/or the relationships rules.

If the web-tool visual editor 714 determines that the active loadable database complies with the syntax rules and/or the relationship rules, the web-tool visual editor 714 may accept the active loadable database and/or transmit an acceptance message to the user device 405, and compile the active loadable database. If the web-tool visual editor 714 determines that the active loadable database does not comply with the syntax rules and/or the relationship rules, the web-tool visual editor 714 may display an error message regarding the active loadable database, and/or display a debugging message to resolve the error message.

To compile the loadable database, the web-tool visual editor 714 may obtain flowchart information from the decision flow chart diagram section 720, MEL information from the requirements list section 722, and content and arrangement of checklists displays of the aircraft display section

726; and compile the loadable database in accordance with the rulebook rules. For instance, a content and arrangement of a checklist of the aircraft display section 726 may be stored in HTML/CSS based on user inputs during the authoring process, and tags may be associated with individual display elements in the HTML/CSS. To compile the content and arrangement, the web-tool visual editor 714 may extract schema information from the HTML/CSS and associated tags, and create one or more data structure(s) and one or more function(s) based on the schema information.

The document version control 734 may store different versions of the active loadable database. The different versions of the active loadable database may be selectable by user inputs to display the selected different version and/or to transmit a different version of the active loadable database to a vehicle. The different versions of the active loadable database may have different information for the flowchart information from the decision flow chart diagram section 720, the MEL information from the requirements list section 722, and the content and arrangement of checklists displays of the aircraft display section 726.

The export icon 736 may be selectable by user inputs to instruct the web-tool visual editor 714 to transmit the active loadable database (or one of the stored different versions of the active loadable database) to one or more vehicles. For instance, in response to a user input on the export icon 736, the web-tool visual editor 714 may transmit a message to the cloud connection to vehicle(s) 708 that includes the active loadable database.

Figure 8:
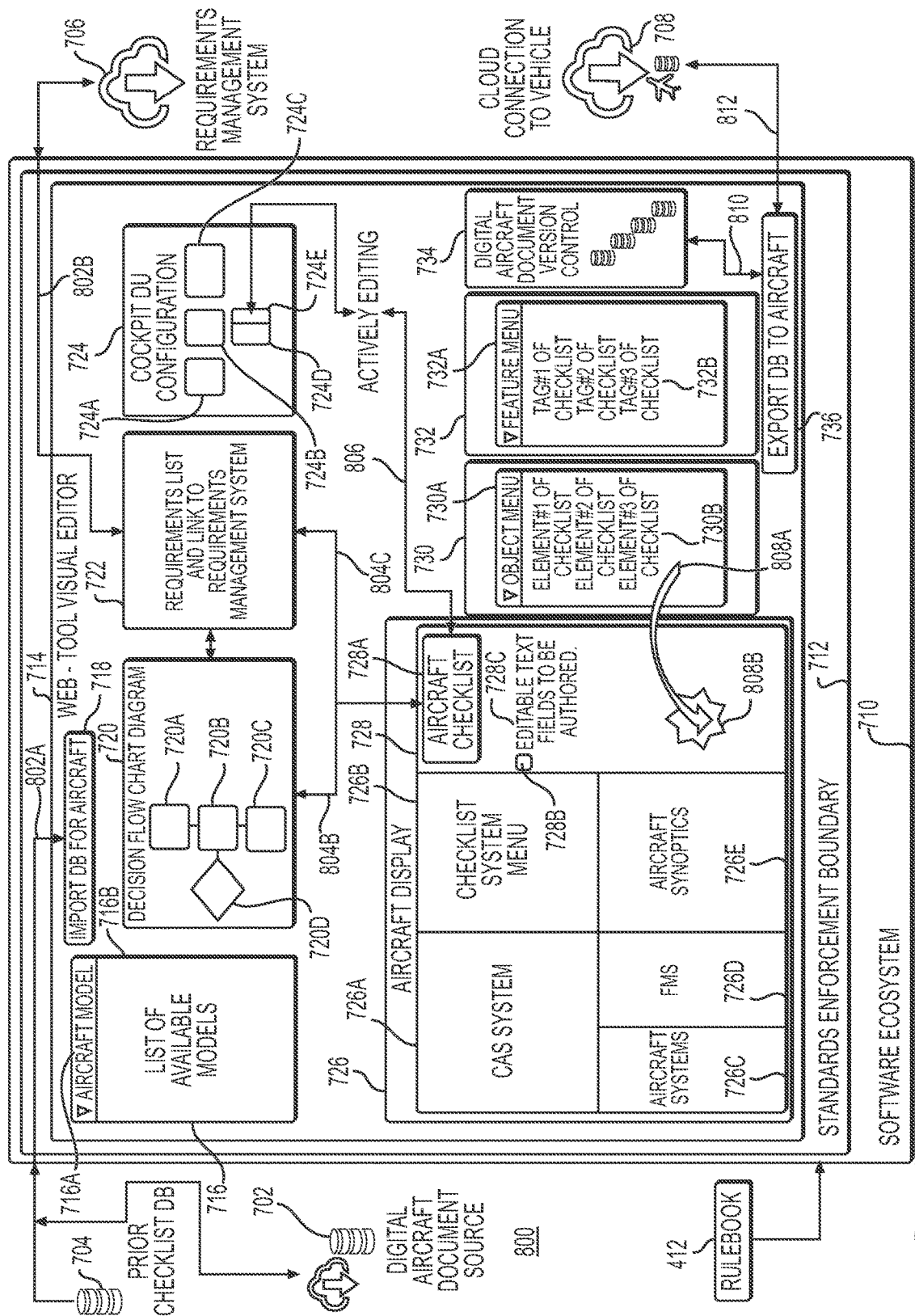
FIG. 8 depicts exemplary processes of a system for a web-based process to generate and deploy electronic checklists, according to one or more embodiments.

FIG. 8 depicts exemplary processes of a system for a web-based process to generate electronic checklists and deploy electronic checklists, according to one or more embodiments. Specifically, FIG. 8 may depict one or more of: an importation process 802A and/or 802B, a transformation process 804A-804C, an active region selection process 806, a checklist design process 808A and 808B, a document version control process 810, and/or an exportation process 812.

The importation process 802a and/or 802B may correspond to one or more of the processes described above with respect to the import icon 718 or the sync button. Specifically, in response to a user input on the import icon 718 or the sync button (or in response to a transmission to an API endpoint for instance), the web-tool visual editor 714 may obtain the digital aircraft document source 702 and/or the digital aircraft document source 702, and/or the one or more MELs for the one or more checklists. The transformation process 804A-804C may correspond to the web-tool visual editor 714 may automatically translating the state change from the user input to the other relevant sections, as discussed above. The active region selection process 806 may correspond to the process of changing the region currently being edited by the user of the user device 405 to a different region of the one or more DUs 724A-724D, as discussed above. The checklist design process 808A and 808B may correspond to the one or more process described above by which changes to the checklist display 728 are performed. The document version control process 810 may correspond to the process described above with respect to the document version control 734 to transmit a different version of the active loadable database to a vehicle. The exportation process 812 may correspond to the process described above with respect to the export icon 736.

Figure 9:
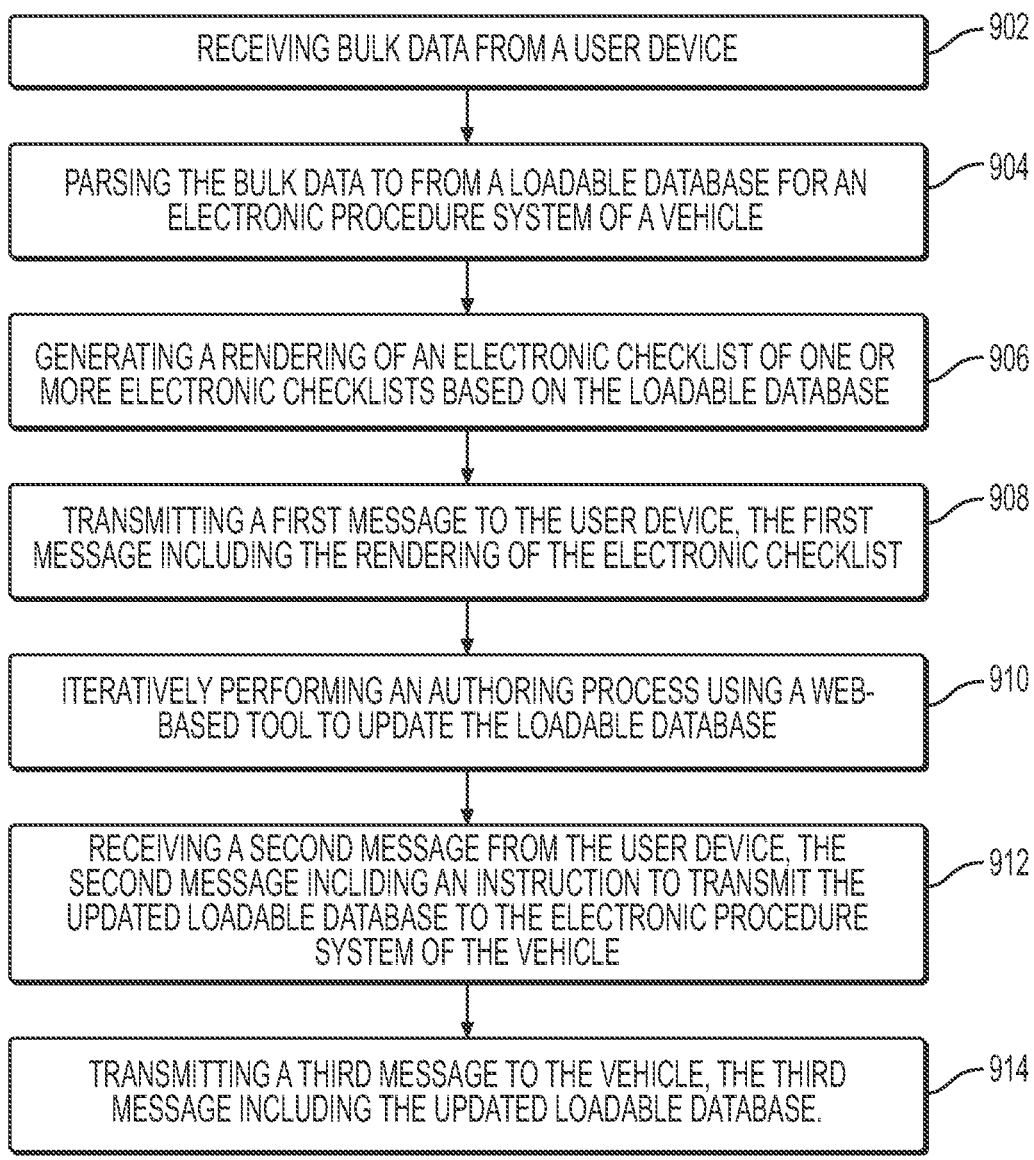
FIG. 9 depicts a flowchart for a web-based process to generate and deploy electronic checklists, according to one or more embodiments.

FIG. 9 depicts a flowchart 900 for a web-based process to generate electronic checklists and deploy electronic checklists, according to one or more embodiments. In the flowchart 900, the process may start at block 902 by receiving bulk data from a user device. Then, the process may proceed to block 904 by parsing the bulk data to form a loadable database for an electronic procedure system of a vehicle. Then, the process may proceed to block 906 by generating a rendering of an electronic checklist of one or more electronic checklists based on the loadable database. Then, the process may proceed to block 908 by transmitting a first message to the user device, the first message including the rendering of the electronic checklist. Then, the process may proceed to block 910 by iteratively performing an authoring process using a web-based tool to update the loadable database. Then, the process may proceed to block 912 by receiving a second message from the user device, the second message including an instruction to transmit the updated loadable database to the electronic procedure system of the vehicle. Then, the process may proceed to block 914 by transmitting a third message to the vehicle, the third message including the updated loadable database.

FIG. 10 depicts an example system that may execute techniques presented herein. FIG. 10 is a simplified functional block diagram of a computer that may be configured to execute techniques described herein, according to exemplary embodiments of the present disclosure. Specifically, the computer (or "platform" as it may not be a single physical computer infrastructure) may include a data communication interface 1060 for packet data communication. The platform may also include a central processing unit ("CPU") 1020, in the form of one or more processors, for executing program instructions. The platform may include an internal communication bus 1010, and the platform may also include a program storage and/or a data storage for various data files to be processed and/or communicated by the platform such as ROM 1030 and RAM 1040, although the system 1000 may receive programming and data via network communications. The system 1000 also may include input and output ports 1050 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

The term "exemplary" is used in the sense of "example" rather than "ideal." As used herein, the singular forms "a," "an," and "the" include plural reference unless the context dictates otherwise.

Other embodiments of the disclosure will be apparent to those skilled in the art from consideration of the specification and practice of the embodiments disclosed herein. It is intended that the specification and examples be considered as exemplary only, with a true scope and spirit of the disclosed embodiments being indicated by the following claims.

What is claimed is:

1. A method for a web-based process to generate electronic checklists and deploy electronic checklists, comprising:
   receiving bulk data comprising one or more documents;
   parsing the bulk data to form a loadable database for an electronic procedure system of a vehicle;
   generating a rendering of an electronic checklist based on the loadable database;
   transmitting the rendering of the electronic checklist to a user device;
   iteratively performing an authoring process using a web-based tool to update the loadable database based on user inputs and/or corresponding data, wherein:
      the web-based tool includes a standards enforcement boundary and a web-tool visual editor; and
      the web-based tool uses the standards enforcement boundary to ensure that generation, modification, and deployment of checklists follow syntax and relationship rules;
   receiving an instruction to transmit the updated loadable database to the electronic procedure system of the vehicle;
   transmitting the updated loadable database to the vehicle;
   further wherein the user inputs and/or the corresponding data include author inputs to:
      add, delete, or edit one or more element(s) in one or more location(s) on a rendering of the checklist; and
      add, delete, or edit one or more tag(s) for an element of the one or more element(s), wherein the tags indicate one of: linking sensor(s) with the element, linking CAS message(s) with the element, and/or linking phase of flight with the element.

2. The method of claim 1, wherein the iteratively performing the authoring process further includes:
   transmitting an update message with confirmation information and/or renderings of checklist GUIs corresponding to the one or more electronic checklists.

3. The method of claim 2, wherein the user inputs and/or the corresponding data further includes the author inputs to:

add, delete, or edit a checklist of the one or more electronic checklists; and/or add, delete, or edit flowcharts for the checklist.

4. The method of claim 3, wherein the one or more element(s) include symbols, objects, and/or text, the symbols are displayable on a checklist GUI and are not interactive, the objects are displayable on the checklist GUI and are interactive, the text are alphanumeric strings of characters, the text are applied to the symbols or the objects to be displayed therewith, and/or displayed separately from the symbols or the objects.

5. The method of claim 3, wherein the author inputs are validated to determine whether the author inputs comply with the syntax rules.

6. The method of claim 3, wherein the electronic procedure system of the vehicle, in response to receiving the updated loadable database, extracts the one or more data structures and the one or more functions from the updated loadable database to initialize the electronic checklist for generation and control of the checklist GUIs, the one or more data structures include content and arrangement information for the checklist GUIs, and the one or more functions include program code for how system and/or user inputs are to update the checklist GUIs.

7. A system for a web-based process to generate electronic checklists and deploy electronic checklists, the system comprising:

a memory storing instructions; and a processor executing the instructions to perform a process including:

receiving bulk data comprising one or more documents;

parsing the bulk data to form a loadable database for an electronic procedure system of a vehicle;

generating a rendering of an electronic checklist based on the loadable database;

transmitting the rendering of the electronic checklist to a user device;

iteratively performing an authoring process using a web-based tool to update the loadable database based on user inputs and/or corresponding data, wherein:

the web-based tool includes a standards enforcement boundary and a web-tool visual editor; and the web-based tool uses the standards enforcement boundary to ensure that generation, modification, and deployment of checklists follow syntax and relationship rules;

receiving an instruction to transmit the updated loadable database to the electronic procedure system of the vehicle;

transmitting the updated loadable database to the vehicle;

further wherein the user inputs and/or the corresponding data include author inputs to:

add, delete, or edit one or more element(s) in one or more location(s) on a rendering of the checklist; and add, delete, or edit one or more tag(s) for an element of the one or more element(s), wherein the tags indicate one of: linking sensor(s) with the element, linking CAS message(s) with the element, and/or linking phase of flight with the element.

8. The system of claim 7, wherein the iteratively performing the authoring process further includes:

transmitting an update message with confirmation information and/or renderings of checklist GUIs corresponding to the one or more electronic checklists.

9. The system of claim 8, wherein the user inputs and/or the corresponding data further includes the author inputs to:

add, delete, or edit a checklist of the one or more electronic checklists; and/or add, delete, or edit flowcharts for the checklist.

10. The system of claim 9, wherein the one or more element(s) include symbols, objects, and/or text, the symbols are displayable on a checklist GUI and are not interactive, the objects are displayable on the checklist GUI and are interactive, the text are alphanumeric strings of characters, the text are applied to the symbols or the objects to be displayed therewith, and/or displayed separately from the symbols or the objects.

11. The system of claim 9, wherein the author inputs are validated to determine whether the author inputs comply with the syntax rules.

12. The system of claim 9, wherein the electronic procedure system of the vehicle, in response to receiving the updated loadable database, extracts the one or more data structures and the one or more functions from the updated loadable database to initialize the electronic checklist for generation and control of the checklist GUIs, the one or more data structures include content and arrangement information for the checklist GUIs, and the one or more functions include program code for how system and/or user inputs are to update the checklist GUIs.

13. A non-transitory computer-readable medium storing instructions that, when executed by a processor, cause the processor to perform a method for a web-based process to generate electronic checklists and deploy electronic checklists, the method comprising:

receiving bulk data comprising one or more documents;

parsing the bulk data to form a loadable database for an electronic procedure system of a vehicle;

generating a rendering of an electronic checklist based on the loadable database;

transmitting the rendering of the electronic checklist to a user device;

iteratively performing an authoring process using a web-based tool to update the loadable database based on user inputs and/or corresponding data, wherein:

the web-based tool includes a standards enforcement boundary and a web-tool visual editor; and the web-based tool uses the standards enforcement boundary to ensure that generation, modification, and deployment of checklists follow syntax and relationship rules;

receiving an instruction to transmit the updated loadable database to the electronic procedure system of the vehicle;

transmitting the updated loadable database to the vehicle;

further wherein the user inputs and/or the corresponding data include author inputs to:

add, delete, or edit one or more element(s) in one or more location(s) on a rendering of the checklist; and add, delete, or edit one or more tag(s) for an element of the one or more element(s), wherein the tags indicate one of: linking sensor(s) with the element, linking CAS message(s) with the element, and/or linking phase of flight with the element.

14. The non-transitory computer-readable medium of claim 13, wherein the iteratively performing the authoring process further includes:
   transmitting an update message with confirmation information and/or renderings of checklist GUIs corresponding to the one or more electronic checklists.

15. The non-transitory computer-readable medium of claim 14, wherein the user inputs and/or the corresponding data further includes the author inputs to:
   add, delete, or edit a checklist of the one or more electronic checklists; and/or
   add, delete, or edit flowcharts for the checklist.

16. The non-transitory computer-readable medium of claim 15, wherein the one or more element(s) include symbols, objects, and/or text,
   the symbols are displayable on a checklist GUI and are not interactive,
   the objects are displayable on the checklist GUI and are interactive,
   the text are alphanumeric strings of characters,
   the text are applied to the symbols or the objects to be displayed therewith, and/or displayed separately from the symbols or the objects.

17. The non-transitory computer-readable medium of claim 15, wherein the author inputs are validated to determine whether the author inputs comply with the syntax rules.

\* \* \* \* \*